United States Patent
Westbrook

(10) Patent No.: US 6,591,024 B2
(45) Date of Patent: Jul. 8, 2003

(54) SYSTEM COMPRISING IN-LINE WAVELENGTH SENSITIVE POLARIMETER

(75) Inventor: Paul Stephen Westbrook, Chatham, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 51 days.

(21) Appl. No.: 09/774,975

(22) Filed: Jan. 31, 2001

(65) Prior Publication Data

US 2001/0038729 A1 Nov. 8, 2001

Related U.S. Application Data

(60) Provisional application No. 60/229,129, filed on Aug. 30, 2000.

(51) Int. Cl.⁷ .................................................. G02B 6/00
(52) U.S. Cl. ............................. 385/11; 385/31; 385/37; 385/48; 356/327
(58) Field of Search .............................. 385/11, 31, 37, 385/39, 48; 356/327

(56) References Cited

U.S. PATENT DOCUMENTS

| 5,440,390 A | | 8/1995 | Tirri ............................ 356/364 |
| 5,446,534 A | * | 8/1995 | Goldman ..................... 356/128 |
| 5,832,156 A | * | 11/1998 | Strasser et al. ............... 385/48 |
| 5,850,302 A | | 12/1998 | Strasser et al. .............. 359/127 |
| 6,002,822 A | | 12/1999 | Strasser et al. ................ 385/48 |
| 6,122,422 A | * | 9/2000 | Koeppen et al. ............. 359/124 |
| 6,211,957 B1 | * | 4/2001 | Erdogan et al. ............. 356/364 |
| 6,363,180 B1 | * | 3/2002 | Yamate et al. .............. 356/35.5 |
| 6,385,369 B1 | * | 5/2002 | Hill et al. .................... 359/483 |

OTHER PUBLICATIONS

Hauge, P.S. "Survey of Methods for the Complete Determination of a State of Polarization," *SPIE vol. 88 Polarized Light*, 3–9 (1976).
Oka, K. et al.m, "Spectroscopic polarimetry with a channeled spectrum," *Optics Lett.*, vol. 24, No. 21, 1477 (1999).
U.S. patent application Ser. No. 09/093,323, filed Jun. 8, 1998.
U.S. patent application Ser. No. 09/517,865, filed Mar. 3, 2000.
U.S. Provisional patent application Ser. No. 60/187,840, filed Mar. 8, 2000.
U.S. Provisional patent application Ser. No. 60/228,265 filed Aug. 25, 2000.

* cited by examiner

*Primary Examiner*—Rodney Bovernick
*Assistant Examiner*—Sung Pak

(57) ABSTRACT

A combined spectrometer/polarimeter device capable of being placed in-line in a WDM optical transmission system is provided. The combined device contains an optical waveguide, wavelength manipulating optics that include one or more wavelength dispersive elements formed in the waveguide, and polarization manipulating optics. The wavelength dispersive elements tap at least a portion of the propagating light from the waveguide, such that the tapped light is directed to or through at least a portion of the polarization manipulating optics. The presence of the wavelength dispersive element(s) allow monitoring of one or more channels present in the propagating light. Thus, the device is able to act as a spectrometer to determine the presence/intensity of channels in the WDM system. In addition, by inclusion of the polarization-manipulating optics, it is further possible to use the same in-line device to monitor polarization characteristics of each such channel (e.g., calculation of a Stokes parameter spectrum or measurement of PMD).

23 Claims, 4 Drawing Sheets

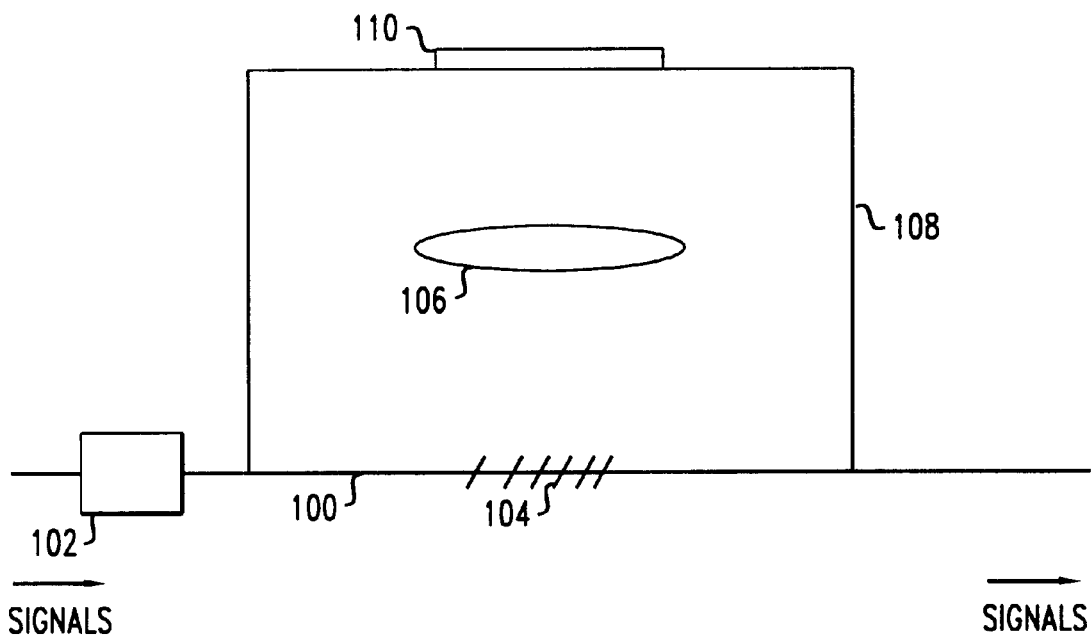

SYSTEM COMPRISING IN-LINE WAVELENGTH SENSITIVE POLARIMETER

CROSS-REFERENCE TO RELATED APPLICATION

This application claims priority of Provisional Application Ser. No. 60/229,129 which was filed Aug. 30, 2000.

BACKGROUND OF THE INVENTION

1. Field of the Invention

The invention relates to optical communications systems comprising both wavelength-monitoring and polarization-monitoring devices.

2. Discussion of the Related Art

Optical communications systems utilizing wavelength division multiplexing (WDM) have become more prevalent and important, as the need and desire to send and receive data has rapidly increased. Stated briefly, WDM systems operate by simultaneously sending data on numerous channels, i.e., wavelengths. During operation of the systems, it is generally necessary to monitor the status of these wavelengths, e.g., ensure that a channel is present and/or is of sufficient intensity.

One technique for such wavelength monitoring is the use of fiber grating-based spectrometers, as discussed for example in co-assigned U.S. Pat. Nos. 5,850,302 and 6,002,822 and co-assigned U.S. patent application Ser. No. 09/093,323 filed Jun. 8, 1998 (our reference Koeppen 1–11), the disclosures of which are hereby incorporated by reference. These spectrometers, in general, utilize an optical fiber having a blazed, i.e., tilted, Bragg grating therein, to direct at least a portion of the propagating light out of the fiber and onto a detector. Selection of particular grating characteristics and/or use of optics induces light of differing channels to impact the detector at distinct locations, allowing the presence/intensity of the different channels to be monitored. Because these spectrometers are fiber-based, it is possible to incorporate them in-line. (In-line indicates that the device is able to be incorporated into the fiber transmission line of a communications system without unduly hindering the system.)

In addition to wavelength monitoring, it is generally desirable to monitor the state of polarization (SOP) of a propagating optical signal, due to the inherent degeneracy associated with polarization. Polarization measurement is important, for example, in accurately orienting polarization maintaining fiber during splicing, in measuring the polarization dependent loss (PDL) of components or system, and in determining the polarization-mode dispersion (PMD) in optical transmission systems. The significance of PMD is increasing due to the development of ever faster-speed, long-haul systems.

Most conventional arrangements for polarization monitoring rely on statistical sampling of polarization states. See, e.g., U.S. Pat. No. 5,440,390. However, real-time monitoring is desirable, particularly if the monitoring can be done in-line. Such in-line systems are reflected in co-assigned U.S. patent application Ser. No. 09/517,865 filed Mar. 3, 2000 (our reference Erdogan 11-38-4) and co-assigned U.S. provisional patent application Ser. No. 60/187,840 filed Mar. 8, 2000 (our reference Erdogan 12-42-7), the disclosures of which are hereby incorporated by reference. The in-line fiber grating polarimeter disclosed in these applications involves use of a series of strongly-blazed Bragg gratings that both tap light from the propagating signal and also constitute polarization sensitive elements. Significantly, provisional patent application 60/187,840 contemplates combining the in-line polarimeter with elements to perform wavelength separation, which would allow one to monitor both wavelength and polarization. See also U.S. patent application Ser. No. 60/228,265 filed Aug. 25, 2000 (our reference Moeller 9–12) for other ways to measure polarizaton states.

Further improvements in both wavelength and polarization monitoring are desired.

SUMMARY OF THE INVENTION

The invention provides a combined spectrometer/polarimeter device capable of being placed in-line in an optical transmission system, typically a WDM system. The combined device contains an optical waveguide, wavelength manipulating optics that include one or more wavelength dispersive elements formed in the waveguide, and polarization manipulating optics. The wavelength dispersive elements tap at least a portion of the propagating light from the waveguide, such that the tapped light is directed to or through at least a portion of the polarization manipulating optics. As in the co-assigned patents and application cited above, the presence of the wavelength dispersive element(s) allow monitoring of one or more wavelengths present in the propagating light. Thus, the device is able to act as a spectrometer. But, in addition, by inclusion of the polarization-manipulating optics, it is further possible to use the same in-line device to monitor the polarization for each such wavelength and/or for particular channels (e.g., calculation of a Stokes parameter spectrum or measurement of PMD).

In one embodiment, reflected in FIGS. 1A and 1B, an optical fiber 10 having a core 12 and a cladding 14 is provided, with a blazed grating 16 formed in the fiber by conventional techniques. The grating reflects, i.e., taps, light (over a range of wavelengths) from the fiber through coupling optics—which comprise in this embodiment an index matching medium 18 a glass block 20, and a reflective element 22—toward a detector array 24. As discussed in the references cited above, in such a configuration, tapped light of wavelength $\lambda_i$ is brought to a focus at some point or along some line on the detector 24 distinct from the point or line of $\lambda_j \neq \lambda_i$. With use of a proper array, the multiple wavelengths are able to be resolved and detected simultaneously over a relatively large bandwidth, e.g., 20 to 50 nm. The configuration is thereby able to act as an in-line spectrometer of the type discussed above. However, according to the invention, the device also provides polarization-manipulating optics 25. In the embodiment of FIGS. 1A and 1B, the necessary polarization optics, e.g., optics 26, 27, 28, 29, are provided between the coupling optics and the detector 24, to allow, for example, calculation of the Stokes parameter. Advantageously, the light tap of this and similar embodiments has substantially no effect on the polarization of the scattered (tapped) light, i.e., the tap induces less than 1 dB of variation in the scattered light as a function of polarization. Also, to keep PDL low, it is advantageous to keep the transmission line free of linear polarizers, and provide dispersive elements that introduce relative low PDL, e.g., less than 0.2 dB.

In another embodiment, reflected in FIG. 6, the system contains a fiber 100 having a portion of polarization manipulating optics (e.g., a four-state polarization controller 102) located in-line, upstream of a blazed grating 104 formed in the fiber 100. Scattered light travels through a lens 106 onto a detector 110. The blazed grating in this embodiment acts both as a wavelength insensitive tap for transmitted light and as a polarizer for scattered light (i.e., as another portion of the polarization monitoring optics). Thus, no distinct polarizer is required between the tap 104 and the detector 110. (Note that the functioning of the tap as a polarizer for scattered light brings the system within the above definition of having the tapped light directed to and/or through at least a portion of the polarization manipulating optics.)

(Wavelength manipulating and polarization manipulating optics include optics performing functions such as manipulating or controlling the polarization or selected wavelengths to allow the ultimate monitoring of wavelength or polarization. Wavelength manipulating optics include, for example, in addition to the wavelength dispersive elements, lenses and reflective elements capable of directing different wavelengths to different regions on a detector. Polarization manipulating optics include, for example, linear polarizers, retardation plates such as quarter- and half-waveplates, four-state polarization controllers, rotating retardation plates, and polarization switches. It is possible for single element to be both wavelength manipulating and polarization manipulating, e.g., providing dual functions as in a highly blazed grating that provides a substantially wavelength-insensitive tap for transmitted light and which also provides a polarizer for scattered light—see FIG. 6 and accompanying discussion. Detectors, typically used to allow monitoring of the presence/strength of particular wavelengths, and to allow monitoring of the polarization states of such wavelengths, are not considered herein to be manipulating optics, unless the detector comprises an integral component that manipulates a wavelength or polarization state, e.g., a birefringent coating or layer.)

BRIEF DESCRIPTION OF THE DRAWINGS

FIG. 6 illustrates a further embodiment of the invention.

DETAILED DESCRIPTION OF THE INVENTION

Figure 1A:
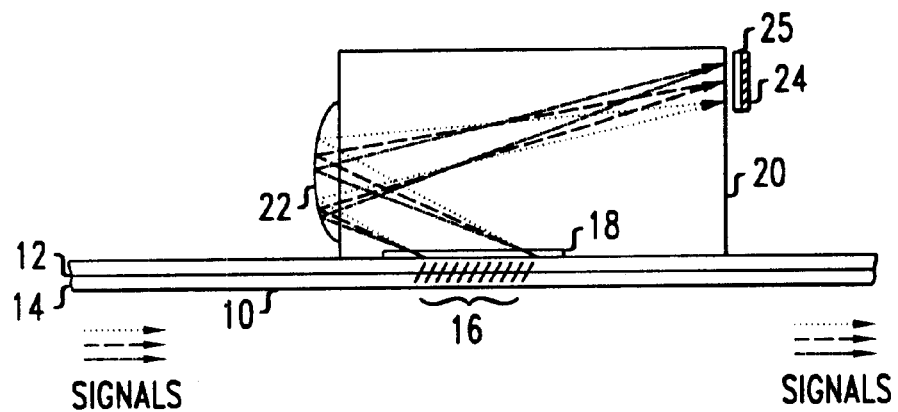
FIGS. 1A and 1B illustrate an embodiment of the invention.

It is useful to provide a clear definition of "state of polarization" (or SOP), with respect to an optical signal propagating through a fiber. In general, if the core-cladding index difference in a given optical fiber is sufficiently small, then the transverse dependence of the electric field associated with a particular mode in the fiber may be written as:

$$E(z,t) = \hat{x} A_x exp(i\phi_x) + \hat{y} A_y exp(i\phi_y)$$

where $A_x$ and $A_y$ define the relative magnitude of each vector component and the phases are defined as follows:

$$\phi_x = \beta z - \omega t + \phi_0, \text{ and}$$

$$\phi_y = \beta z - \omega t + \phi_0 - \delta,$$

where $\beta$ defines the propagation constant, $\omega$ defines the angular frequency, $\phi_0$ defines an arbitrary phase value, and $\delta$ is the relative phase difference between the two orthogonal components of the electric field.

In accordance with the teachings of the present invention, the state of polarization (SOP) of an optical fiber will be described using the Jones calculus and the Stokes parameters, since these are both complete and commonly used. In terms of equation (1), the Jones vector J that describes the field at any location z or point in time t is given by the following:

$$J = (A_x exp(i\phi_x), A_y exp(i\phi_y)) = exp(i\phi_x)(A_x, A_y exp(-i\delta)).$$

In practice, the factor $exp(i\phi_x)$ is ignored, so that the state of polarization is described by the three main parameters: $A_x$, $A_y$, and $\delta$. The physical interpretation of these three parameters is most commonly based on the polarization ellipse, which describes the path traced out by the tip of the electric field vector in time at a particular location, or in space at a particular time. It should be noted that the Jones vector description is valid only for monochromatic light, or a single frequency component of a signal.

A more complete description of the state of polarization is based on the defined Stokes parameters, since this method also accounts for the degree of polarization (DOP) of a non-monochromatic signal. In terms of the Jones vector parameters, the four Stokes parameters are defined by:

$$S_0 = A_x^2 + A_y^2$$

$$S_1 = A_x^2 - A_y^2$$

$$S_2 = 2 A_x A_y \cos \delta$$

$$S_3 = 2 A_x A_y \sin \delta,$$

and the degree of polarization (DOP), $0 \leq DOP \leq 1$, is defined to be:

$$DOP = \sqrt{\frac{S_1^2 + S_2^2 + S_3^2}{S_0}}.$$

A partially polarized signal can be considered to be made up of an unpolarized component and a polarized component. The DOP is used to define that fraction of the signal which is polarized, and this fraction may be described by either the polarization ellipse or Jones vector. It is to be noted that, in strict terms, there are four parameters that are required to fully describe the elliptical signal: (1) the shape of the ellipse; (2) the size of the ellipse; (3) the orientation of the major axis; and (4) the sense of rotation of the ellipse. Thus, four measurements are required to unambiguously define the signal. These four parameters are often taken to be $A_x$, $A_y$, the magnitude of $\delta$, and the sign of $\delta$. The four Stokes parameters also provide a complete description of fully as well as partially polarized light. The Jones vector may be derived from the Stokes parameters according to:

$$A_x = \sqrt{S_0 + S_1}/\sqrt{\sqrt{2}}$$

$$A_y = \sqrt{S_0 - S_1}/\sqrt{\sqrt{2}}$$

$$\delta = \arctan(S_3/S_2)$$

It is to be noted that the last equation above does not unambiguously determine $\delta$. Most numerical implementations of $\theta = \arctan(x)$ define the resulting angle such that $-\pi/2 < \theta < \pi/2$. Thus, for $S_2 \geq 0$, the expression $\delta = \arctan(S_3/S_2)$ should be used, where as for $S_2 < 0$, the expression $\delta = \arctan(S_3/S_2) \pm \pi$ should be used. Therefore, with the knowledge of the four Stokes parameters, it is possible to fully determine the properties of the polarized signal.

It has been recognized in accordance with the teachings of the present invention that the full state of polarization (SOP) cannot be determined by merely evaluating the signal passing through a single polarizer. Birefringence alone has also been found to be insufficient. In particular, a polarimeter may be based on a presumption that the optical signal to be analyzed is passed through a compensator (birefringent) plate of relative phase difference ⌈ with its "fast" axis oriented at an angle C relative to the x axis (with the light propagating along the z direction). Further, it is presumed that the light is subsequently passed through an analyzer with its transmitting axis oriented at an angle A relative to the x axis. Then, it can be shown that the intensity I of the light reaching a detector disposed behind the compensator and analyzer can be represented by:

$$I(A,C,\lceil)=\tfrac{1}{2}\{S_0+S_1[\cos(2C)\cos(2[A-C])-\sin(2C)\sin(2[A-C])\cos(\lceil)]+S_2[\sin(2C)\cos(2[A-C])+\cos(2C)\sin(2[A-C])\cos(\lceil)]+S_3\sin(2[A-C])\sin(\lceil)\}.$$

In this case, $S_j$ are the Stokes parameters of the light incident on the compensator, such that $S_0$ is the incident intensity. If the compensator is a quarter-wave plate ($\lceil = \pi/2$), then the intensity as defined above can be reduced to:

$$I(A,C,\pi/2)=\tfrac{1}{2}\{S_0+[S_1\cos(2C)+S_2\sin(2C)]\cos(2[A-C])+S_3\sin(2[A-C])\},$$

Whereas if the compensator is removed altogether ($\lceil = 0$), the equation for the intensity I reduces to:

$$I(A,-,0)=\tfrac{1}{2}\{S_0+S_1\cos(2A)+S_2\sin(2A)\}.$$

This latter relation illustrates conclusively that it is impossible, without introducing birefringence, to determine the value of $S_3$, and hence the sense of rotation of the polarization ellipse.

Following from the equations as outlined above, a polarimeter may be formed using a compensator (for example, a quarter-wave plate), a polarizer, and a detector. In particular, the following four measurements, used in conventional polarimeters, unambiguously characterize the Stokes parameters:

1) no wave plate; no polarizer→$I(-,-,0)=S_0$
2) no wave plate; linear polarizer along x axis→$I(0,-,0)=\tfrac{1}{2}(S_0+S_1)$
3) no wave plate; linear polarizer at 45°→$I(45,-,0)=\tfrac{1}{2}(S_0+S_2)$
4) quarter-wave plate at 0°; linear polarizer at 45°→$I(45,0,\pi/2)=\tfrac{1}{2}(S_0+S_3)$.

In a conventional polarimeter using this set of equations, the measurements may be performed sequentially with a single compensator, polarizer and detector. Alternatively, the measurements may be performed simultaneously, using multiple components by splitting the incoming beam of light into four paths in a polarization-independent fashion.

One method for monitoring PMD involves measuring the degree of polarization, which may be related to first-order PMD. Another method involves measuring the Jones matrix of the transmission link and extracting PMD in formation. (See, e.g., U.S. patent application Serial No. 60/228,265.)

In one embodiment of the invention, reflected in FIG. 1A, an optical waveguide is provided, typically an optical fiber 10 having a core 12 and a cladding 14. A blazed grating 16 is formed in the fiber 10 by conventional techniques. The grating reflects light (over a range of wavelengths) from the fiber 10 through coupling optics—which comprise in this embodiment an index matching medium 18 a glass block 20, and a reflective element 22—onto a detector array 24. As discussed in the references cited above, in such a configuration, tapped light of wavelength $\lambda_i$ is brought to a focus at some point or along some line on the detector 24 distinct from the point or line of $\lambda_j \approx \lambda_i$. This is reflected in FIG. 1B, which is a top view of the arrangement of FIG. 1A, showing the impact locations of light of varying wavelengths on the detector 24. As discussed in those cited references, with use of a proper array, the multiple wavelengths are able to be resolved and detected simultaneously over a relatively large bandwidth, e.g., 20 to 50 nm. The configuration is thereby able to act as an in-line spectrometer of the type discussed in the co-assigned patents and application cited above.

Figure 1B:
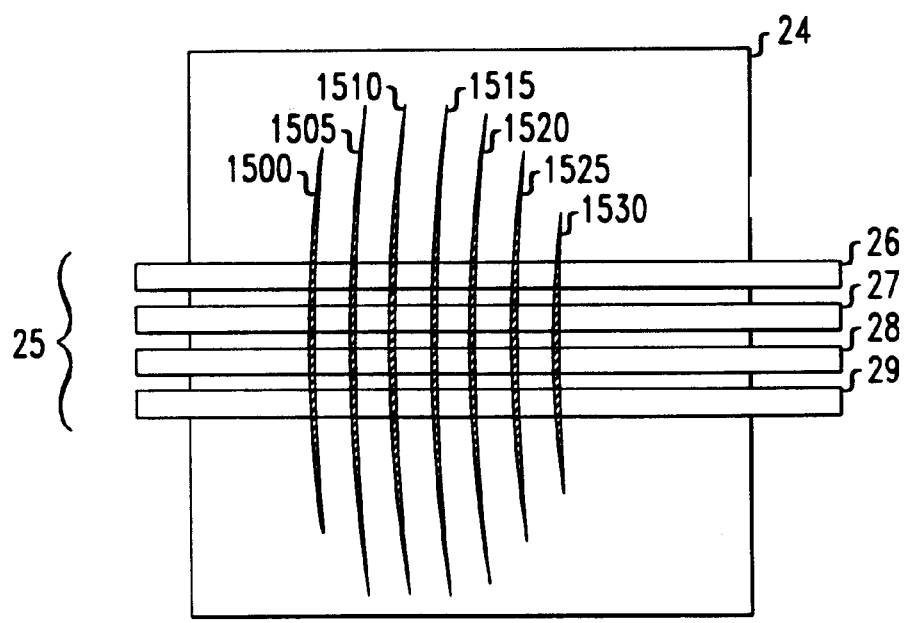

As indicated above, the view in FIG. 1B shows the impact locations of light of varying wavelengths on the detector 24. The light of varying wavelengths in this illustration includes light denoted 1500, 1505, 1510, 1515, 1520, 1525 and 1530, as shown.

The configuration of the invention also provides polarization-manipulating optics 25, e.g., polarization sensitive optics. In the embodiment of FIGS. 1A and 1B, the necessary polarization optics are provided between the coupling optics and the detector 24, to allow, e.g., calculation of the Stokes parameter. For example, the distinct polarization optics 26, 27, 28, 29 located over the detector 24 (see FIG. 1B) provide the following four distinct measurements, to unambiguously characterize the Stokes parameter:

Optics 26: no wave plate, no polarizer (i.e., no polarization optics):

$$I(-,-,0)=S_0$$

Optics 27: no wave plate, linear polarizer along x axis:

$$I(0,-,0)=\tfrac{1}{2}(S_0+S_1)$$

Optics 28: no wave plate, linear polarizer at 45°:

$$I(45,-,0)=\tfrac{1}{2}(S_0+S_2)$$

Optics 29: quarter wave plate fast axis at 0°, linear polarizer at 45°:

$$I(45,0,\pi/2)=\tfrac{1}{2}(S_0+S_3)$$

In this way, the polarization characteristics of the propagating signals are able to be monitored, and, more importantly, in combination with the spectrometer function of the configuration, the polarization characteristics of each channel are able to be monitored as a function of wavelength.

A variety of waveguides are possible, in addition to optical fiber, e.g., planar waveguides, and devices with a variety of waveguides are readily formed following the guidelines herein.

It is possible to use a variety of index matching materials, or possibly none at all. Typically, an index matching material is advantageous, however. It is also possible to use a variety of alternatives to or modifications of the glass block 20 and reflective element 22, e.g., a glass block alone (using internal reflection to direct the tapped light), or incorporation of lenses or additional mirrors, or blocks of other materials. The reflective element 22 of FIG. 1A, or a similarly arranged lens, is often advantageous to direct light of varying wavelengths onto specified locations of a detector array. In one particular modification of FIG. 1A, it is possible to use an additional reflective element, such that the scattered light is directed off two separate reflective elements before encountering the detector. See also FIGS. 13 and 15 of U.S. Pat. No. 6,002,822. Selection of the particular elements of the coupling optics will depend, in part, on the particular grating, as discussed below.

Typically, the wavelength dispersive element is a blazed Bragg grating, although it is possible to use other dispersive elements. It is possible to use a blazed grating over a variety of tilt angles, with a typical blaze angle being about 3° to about 15° (measured as the rotation of the grating from the normal to the waveguide's propagation direction). There are competing consideration for selecting a tilt angle. For example, to keep the blazed grating substantially polarization-independent, a relatively small tilt angle is desired, e.g., 8° or less, and such tilt also gives a more broadband wavelength response. However, the larger the tilt angle, the lower the azimuthal spreading of the coupled light, i.e., the larger the blaze, the larger the fraction of the reflected light that reaches the detector. Yet, larger azimuthal spread eases manufacture and assembly of the overall devices.

In addition to blaze considerations, it is possible to use either a chirped or unchirped grating. Techniques for forming both types of gratings are known to those skilled in the art, e.g., exposure of the fiber through a phase mask or by interfering two beams in the core of the fiber. While a chirped grating, as known in the art, will itself generally provide focusing of light of differing wavelengths, it is possible to use optics, e.g., a lens, in combination with an unchirped grating to similarly focus light of differing wavelengths onto distinct regions of a detector. See, e.g., FIGS. 13 and 15 of U.S. Pat. No. 6,002,822. It is also possible to bend the portion of the fiber in which the grating is formed, to provide focusing of the tapped light.

The location of the polarization manipulating optics also involves several considerations, including the angle at which the scattered light propagates, and advantageous positioning to reduce or prevent coupling between spatial variation and wavelength variation. In addition, while the embodiments described herein tend to show polarization manipulating optics adjacent to a detector, it is also possible to locate polarization manipulating optics at locations distant from the detector. Consideration of such factors is within the ability of one skilled in the art.

The detector is typically a device such as a InGaAs PIN diode for 1550 nm light.

Figure 2:
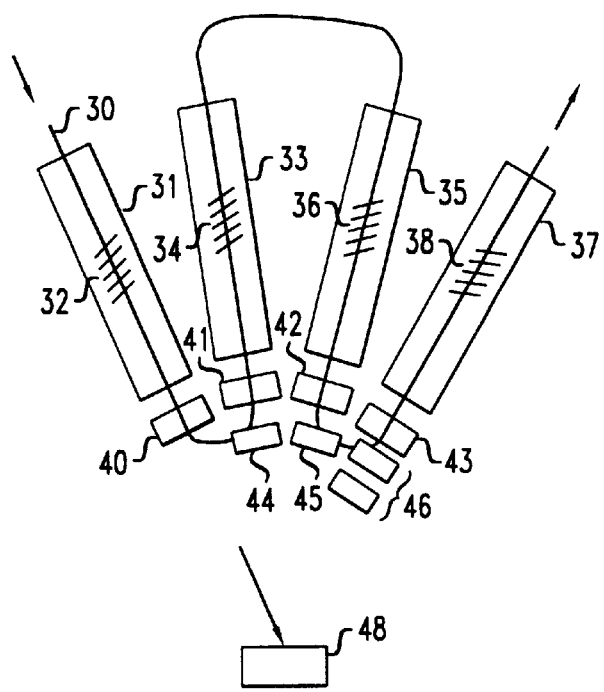
FIG. 2 illustrates another embodiment of the invention.

Another embodiment of the invention is reflected in FIG. 2. This arrangement contains an optical fiber length 30 in which four blazed gratings 32, 34, 36, 38 are formed. The gratings are designed in the same manner as discussed above, to tap some of the propagating light, such that the tapped light is able to be directed onto a detector array 48. Specifically, as in the above embodiment, glass blocks 31, 33, 35, 37 are located adjacent (typically bonded to) the optical fiber in the region around the blazed gratings 32, 34, 36, 38. As discussed above, the glass blocks direct the tapped light, through use of, e.g., reflection or lenses, toward the detector array. (For purposes of clarity, the Figure shows space between the blocks, the polarization monitoring optics, and the detector array. Typically, as apparent to one skilled in the art, all optics will be connected with glass, e.g., as reflected in FIG. 1A.)

The reflection from the four different blazed gratings 32, 34, 36, 38 makes it possible to perform the Stokes parameter calculations discussed above. Specifically, polarization manipulating optics 44, 45, 46 (with no optics located between grating 32 and the detector array 48) are located such that tapped light must pass through the polarization manipulating optics 44, 45, 46 before reaching the detector. However, unlike the above embodiment, the embodiment of FIG. 2 uses shutters 40, 41, 42, 43 to control which tapped light is reaching the detector array. (The shutters 40, 41, 42, 43 are not located in the path of optical transmission fiber 30, but are located in the path taken by the light reflected from the blazed gratings. FIG. 2, if presented in three dimensions, would show the shutters located above or below the fiber 30. The shutters are desirably close to the fiber 30, to increase the ability to block scattering light, but advantageously do not interrupt the index matching between the fiber 30 and the blocks.) Because the Stokes parameter calculations require 4 separate measurements, the shutters provide the needed sequential monitoring of light from the blazed gratings, e.g., first the light from grating 32 is measured, then the light from grating 34, then from grating 36, and finally from grating 38. The reflected light from the blazed gratings 32, 34, 36, 38 also allows for wavelength monitoring, as discussed above. Also, note that it is possible to do polarization-independent wavelength monitoring with the light tapped from the first grating 32 (and to use the other gratings to cancel any polarization dependence exhibited by the first grating 32).

Figure 3:
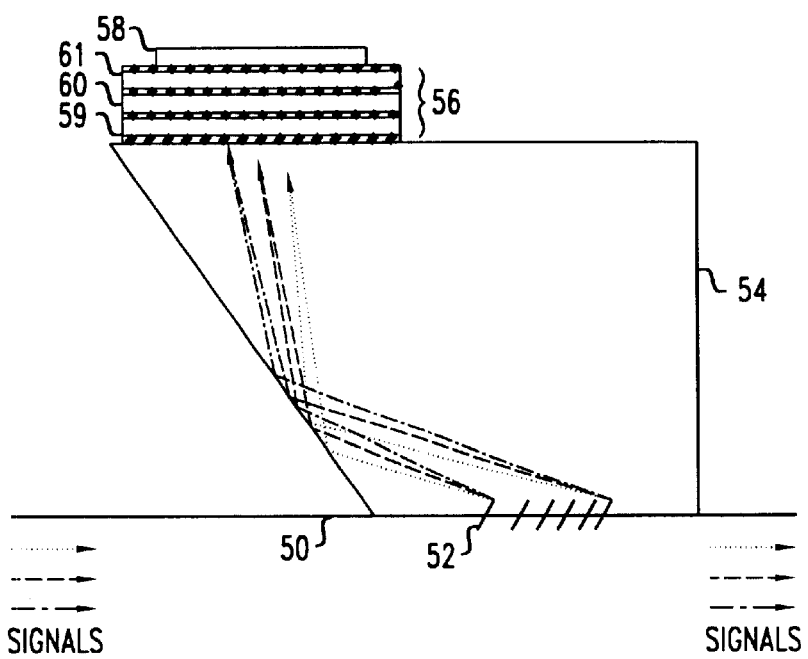
FIG. 3 illustrates a further embodiment of the invention.

Another embodiment is shown in FIG. 3. This system contains an optical transmission fiber 50, with a single blazed Bragg grating 52 formed therein and single detector array 58. As discussed with respect to FIGS. 1A and 1B, the tapped light from the grating 52 is directed into coupling optics, in this case a glass block 54 (optionally adhered to the fiber 50 with an index matching epoxy or having an index matching fluid located between the block 54 and the fiber 50). As discussed above, light of differing wavelengths is directed to different locations on the detector array 58 (by use of reflection, e.g., in the case of a chirped grating, or by use of a lens, e.g., in the case of an unchirped grating), allowing wavelength monitoring to be performed.

Wavelength sensitive polarization monitoring is also performed. In this embodiment, the polarization manipulating optics 56 are adjustable, and thereby allow all four of the measurements necessary for the Stokes parameter calculation to be sequentially performed. Specifically, the polarization manipulating optics include in this embodiment a rotatable half-waveplate 59, a rotatable quarter-waveplate 60, and a polarizer 61. Manipulation of the optics to make the necessary measurements is within the ability of one skilled in the art.

In addition, it is apparent that a variety of different optics are possible instead of rotatable half-waveplate 59, rotatable quarter-waveplate 60, and polarizer 61. See, for example, the various schemes presented in P. S. Hauge, "Survey of Methods for the Complete Determination of a State of Polarization," *SPIE Vol.* 88 *Polarized Light*, 3–9 (1976), the disclosure of which is hereby incorporated by reference. In particular, schemes 1 to 3 of the article are clearly applicable to the embodiment of FIG. 3. See also K. Oka and T. Kato, "Spectroscopic polarimetery with a channeled spectrum," *Optics Lett.*, Vol. 24, No. 21, 1477 (1999). A variety of retardation plates such as half- and quarter-waveplates are possible. Even birefringent layers or coatings on a detector are expected to provide suitable polarizing functions.

Figure 4:
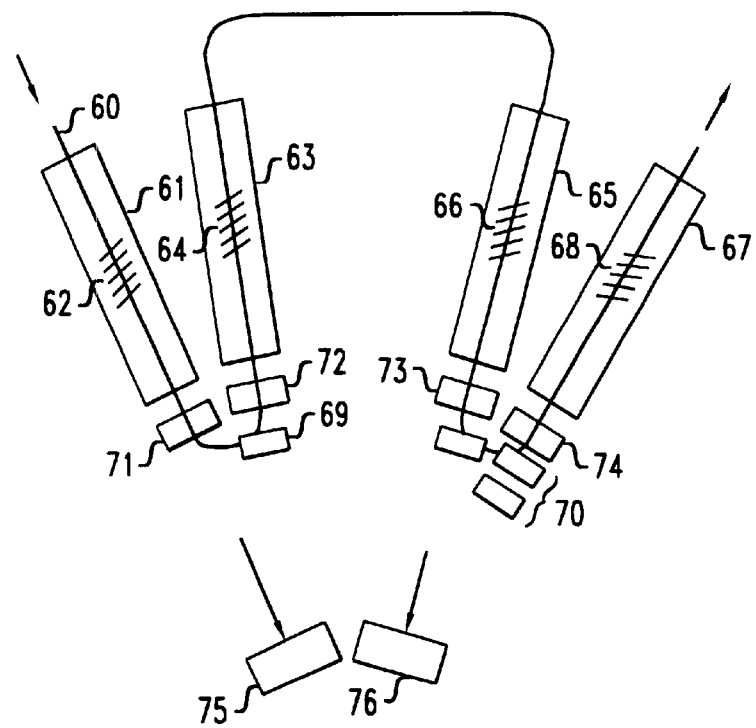
FIG. 4 illustrates a further embodiment of the invention.

Various combinations of the configurations of FIGS. 1A, 1B, 2 and 3 are also possible. For example, FIG. 4 shows a system having an optical transmission fiber 60 with four blazed Bragg gratings 62, 64, 66, 68 formed therein. Glass blocks 61, 63, 65, 67 are located adjacent (typically bonded to) the optical fiber in the region around the blazed gratings. (A single glass block is also possible.) The glass blocks direct the tapped light, through use of, e.g., reflection or lenses, onto the detector arrays 75, 76. In this embodiment, as opposed to the embodiment of FIG. 2, two detector arrays 75, 76 are used, allowing simultaneous monitoring from two of the blazed gratings, e.g., grating 62 and grating 66, or grating 64 and grating 68. Like the embodiment of FIG. 2, shutters (again located outside the fiber 60 transmission line) 71, 72, 73, 74 control which tapped light is reaching the polarization manipulating optics 69, 70 and the detector arrays 75, 76. Because the Stokes parameter calculations require 4 separate measurements, the shutters provide the needed sequential monitoring of light from the blazed gratings, e.g., light reflected from either grating 62 or grating 64 is blocked, and light reflected from either grating 66 or grating 68 is blocked. The reflected light from the blazed gratings 62, 64, 66, 68 also allows for wavelength monitoring, as discussed above. Also, as with the embodiment of FIG. 2, note that it is possible to do polarization-independent wavelength monitoring with the light tapped from the first grating (and to use the other gratings to cancel any polarization dependence exhibited by the first grating).

Figure 5:
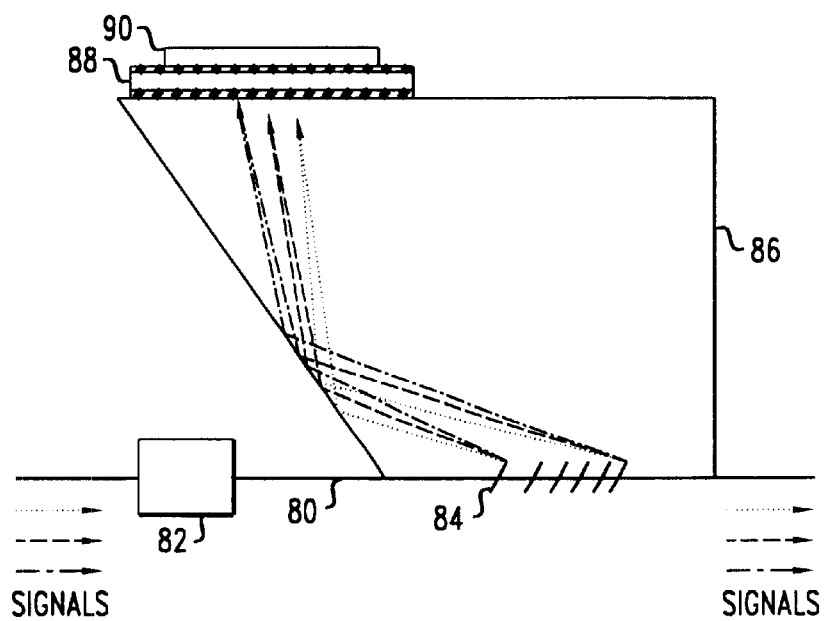
FIG. 5 illustrates a further embodiment of the invention.

Another embodiment of the in-line polarimeter/spectrometer of the invention is shown in FIG. 5. In this embodiment, a portion of the polarization manipulating optics is in the fiber 80 transmission line—upstream of the blazed grating 84, while another portion of the polarization manipulating optics is located between the blazed grating 84 and the detector array 90. As in the above embodiments, the blazed Bragg grating 84 reflects some of the propagating light, which moves into a glass block 86, where reflection or optics are used to direct light of differing wavelengths onto the detector array 90. In this particular embodiment, however, dynamically varying polarization manipulating optics are used, e.g., a 4-state polarization controller 82 located upstream of the blazed grating 84. Four-state polarization controllers are known in the art, and provide four, known polarization transformations without introducing PDL in the transmitted light. Thus, it is possible to control the polarization state of the light reaching the blazed grating 84, e.g., a portion of the polarization manipulation required for the ultimate polarization monitoring is done before the light is reflected. (Other optics are possible in the place of the 4-state controller, e.g., of the type discussed in Hauge, "Survey of Methods for the Complete Determination of a State of Polarization," supra.) Then, with a polarizer 88 located in front of the detector 90, it is possible to perform the four measurements required for the Stokes parameter calculation, based on sequentially changing the polarization state of the incoming light with the 4-state polarization controller. This embodiment still allows the overall device to be placed in-line, but keeps the polarizer—which causes substantial PDL—outside the fiber transmission line. And, again, the configuration, in addition to polarization monitoring, also allows wavelength monitoring to be performed. Monitoring the polarization with the 4-state polarization controller and the polarizer, or other polarization optics, is within the ability of one skilled in the art (again, see Hauge, "Survey of Methods for the Complete Determination of a State of Polarization," supra.)

A further embodiment is reflected in FIG. 6. This system contains a fiber 100 having a portion of polarization manipulating optics (e.g., a four-state polarization controller 102) located in-line, upstream of a blazed grating 104 formed in the fiber 100. Scattered light travels through a lens 106 onto a detector 110. The blazed grating in this embodiment acts both as a wavelength insensitive tap for transmitted light and as a polarizer for scattered light (i.e., as another portion of the polarization monitoring optics). Thus, no distinct polarizer is required between the tap 104 and the detector 110, in contrast to the embodiment of FIG. 5. (Note that the functioning of the tap as a polarizer for scattered light brings the system within the above definition of having the tapped light directed to or through at least a portion of the polarization manipulating optics.)

In particular, the blazed grating 104 in this embodiment is designed to scatter light substantially perpendicularly to the fiber, by selection of an appropriate grating period. By coupling the light out at a substantially perpendicular angle, a high degree of polarization selectivity is attained. These types of gratings are discussed, for example, in co-assigned U.S. patent application Ser. No, 09/517,865 filed Mar. 3, 2000 (our reference Erdogan 11-38-4) and co-assigned U.S. provisional patent application Ser. No. 60/187,840 filed Mar. 8, 2000 (our reference Erdogan 12-42-7), cited above. Advantageously, the grating has about a 45° blaze, which provides high directional selectivity, suitable coupling efficiency, and scattering over a relatively broad wavelength range. Also, in this embodiment, it is useful to include another grating downstream of the tap, to compensate for any PDL introduced by the tap.

Other embodiments of the invention will be apparent to those skilled in the art from consideration of the specification and practice of the invention disclosed herein, including various combinations of the elements of the embodiments disclosed above.

What is claimed is:

1. An in-line spectrometer/polarimeter device, the device comprising:

an optical waveguide;

wavelength manipulating optics capable of manipulating one or more wavelengths, the wavelength manipulating optics comprising one or more wavelength dispersive elements in the optical waveguide; and polarization manipulating optics capable of manipulating the polarization of the one or more wavelengths, wherein the one or more wavelength dispersive elements tap from the waveguide at least a portion of light propagating through the waveguide, such that the tapped light is directed to or through at least a portion of the polarization manipulating optics, wherein one or more of the wavelength dispersive elements optionally functions as a portion of the polarization manipulating optics, and wherein the device provides for monitoring of the one or more wavelengths present in the light propagating through the waveguide and for monitoring of the polarization characteristics of each of the one or more channels.

2. The device of claim 1, wherein the one or more wavelength dispersive elements comprise one or more blazed Bragg gratings.

3. The device of claim 2, wherein the device further comprises one or more coupling optics adjacent the one or more gratings, such that the tapped light is directed into the coupling optics.

4. The device of claim 3, wherein the one or more coupling optics comprise at least one glass block.

5. The device of claim 4, wherein the one or more coupling optics further comprise at least one element selected from the group consisting of lenses and reflective elements.

6. The device of claim 2, wherein each of the one or more blazed Bragg gratings induces less than 1 dB of variation in the tapped light as a function of polarization.

7. The device of claim 1, wherein the optical waveguide is free of in-line linear polarizers.

8. The device of claim 1, wherein the polarization manipulating optics contribute to calculation of a Stokes parameter for the tapped light.

9. The device of claim 1, wherein the waveguide is an optical fiber.

10. The device of claim 2, wherein the device comprises greater than one blazed Bragg grating.

11. The device of claim 10, wherein the device comprises one or more shutters, each of the shutters capable of blocking at least a portion of the tapped light from reaching one or more detectors located near the waveguide.

12. The device of claim 1, wherein a portion of the polarization manipulating optics is located upstream of at least one of the wavelength dispersive elements.

13. The device of claim 12, wherein the portion of the polarization manipulating optics located upstream of at least one of the wavelength dispersive elements comprise dynamically variable polarization manipulating optics.

14. The device of claim 2, wherein at least one blazed Bragg grating functions as a portion of the polarization manipulating optics.

15. The device of claim 14, wherein the at least one blazed Bragg grating that functions as a portion of the polarization manipulating optics scatters the tapped light substantially perpendicular to the propagation direction of the optical waveguide.

16. The device of claim 15, wherein the at least one blazed Bragg grating that functions as a portion of the polarization manipulating optics has a blaze of about 45°.

17. The device of claim 1, further comprising one or more detectors, wherein at least a portion of the tapped light encounters at least a portion of the polarization manipulating optics prior to encountering one of the detectors.

18. The device of claim 17, wherein the polarization manipulating optics comprise at least one element selected from the group consisting of a linear polarizer and a retardation plate, and wherein the tapped light encounters one of the elements selected from the group consisting of a linear polarizer and a retardation plate prior to encountering one of the detectors.

19. The device of claim 18, wherein the polarization manipulating optics comprise a linear polarizer, a quarter-wave plate, and a half-wave plate.

20. The device of claim 17, wherein the polarization manipulating optics comprise one or more polarizers located such that at least a portion of the tapped light encounters one of the polarizers prior to encountering one of the detectors.

21. The device of claim 17, wherein for propagating light comprising multiple wavelengths, distinct wavelengths in the tapped light are directed to distinct regions of the one or more detectors.

22. The device of claim 21, wherein the distinct wavelengths in the tapped light are directed by use of a chirped blazed Bragg grating.

23. The device of claim 21, wherein the distinct wavelengths in the tapped light are directed by use of a non-chirped blazed Bragg grating in combination with at least one element selected from the group consisting of one or more lenses and one or more reflective elements.

* * * * *